No. 882,750. PATENTED MAR. 24, 1908.
J. A. EATON.
ROTARY ENGINE.
APPLICATION FILED MAY 31, 1907.

4 SHEETS—SHEET 1.

No. 882,750. PATENTED MAR. 24, 1908.
J. A. EATON.
ROTARY ENGINE.
APPLICATION FILED MAY 31, 1907.

4 SHEETS—SHEET 2.

No. 882,750. PATENTED MAR. 24, 1908.
J. A. EATON.
ROTARY ENGINE.
APPLICATION FILED MAY 31, 1907.

4 SHEETS—SHEET 4.

Witnesses
Harry R. L. White
Ray White

Inventor
James A. Eaton,
By Charles W. ___, Atty.

UNITED STATES PATENT OFFICE.

JAMES ALLEN EATON, OF CHICAGO, ILLINOIS.

ROTARY ENGINE.

No. 882,750.  Specification of Letters Patent.  Patented March 24, 1908.

Application filed May 31, 1907. Serial No. 376,523.

*To all whom it may concern:*

Be it known that I, JAMES ALLEN EATON, a citizen of the United States, and a resident of the city of Chicago, in the county of Cook and State of Illinois, have invented certain new and useful Improvements in Rotary Engines; and I do hereby declare that the following is a full, clear, and exact description of the same, reference being had to the accompanying drawings, and to the letters of reference marked thereon, which form a part of this specification.

This invention relates to improvements in rotary engines adapted also for use as a pump and has for its object a construction embracing a pressure cylinder for the motive fluid in which it acts both directly and expansively on the rotative driven element.

It has also for an object a construction in which the maximum efficiency of expansion is secured where steam is employed as the motive fluid.

It has further as its object a balanced construction adapted for high speed and capable of use either as an engine or a pump as preferred.

It is also an object of the invention to afford a reversible engine of the class described in which the controlling valves operate equally well in either direction and are perfectly balanced.

It is a final object of the invention to afford an exceedingly cheap, simple durable and powerful device of the class described comprising two principal parts perfectly balanced and so constructed as to render all parts thereof perfectly controllable.

The invention consists in the matters hereinafter described and more fully pointed out and defined in the appended claims.

Figure 1:
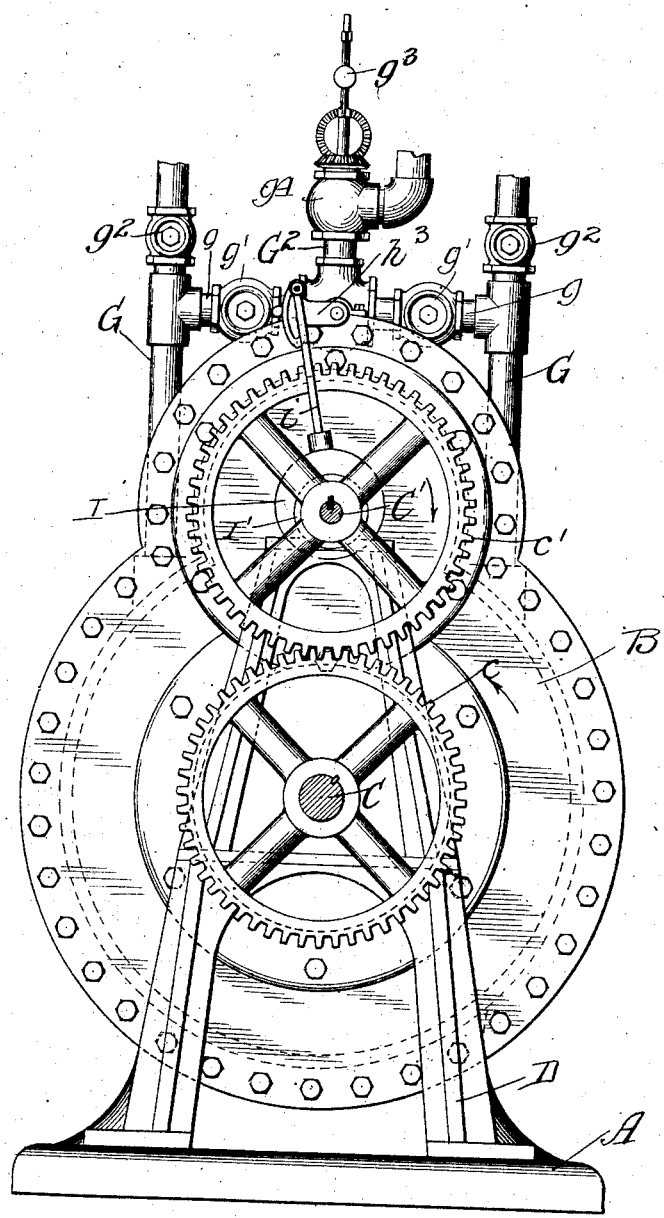
Figure 2:
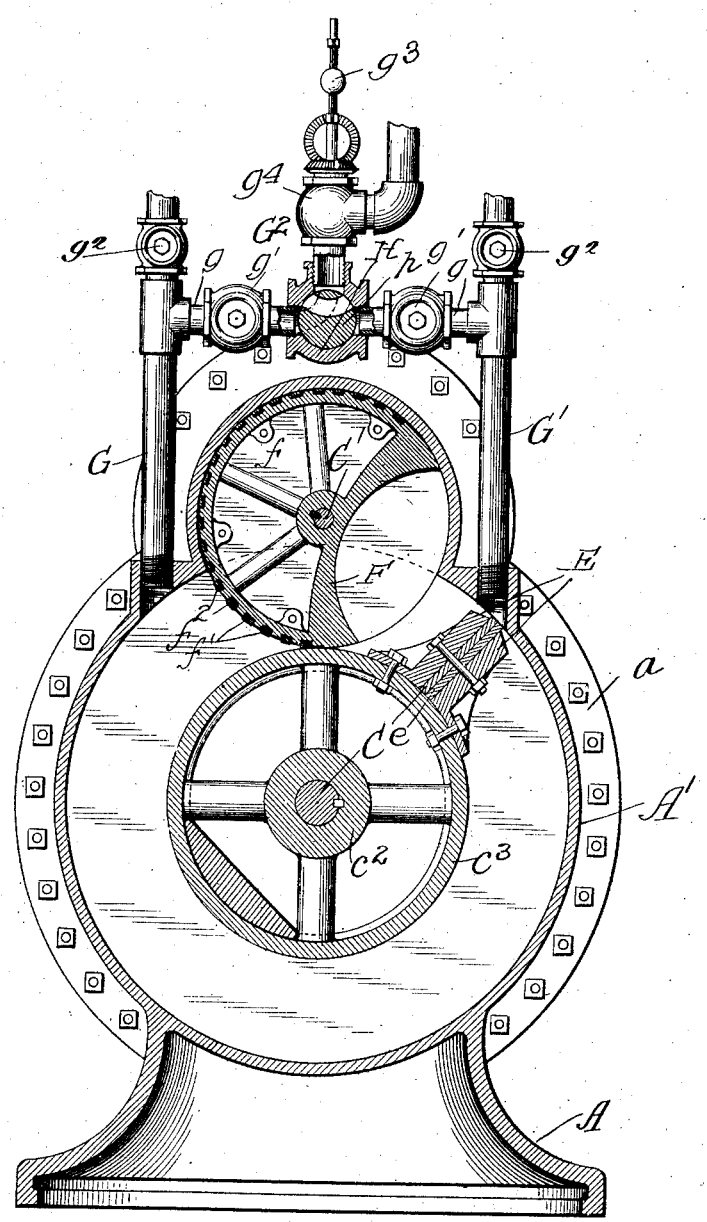
Figure 3:
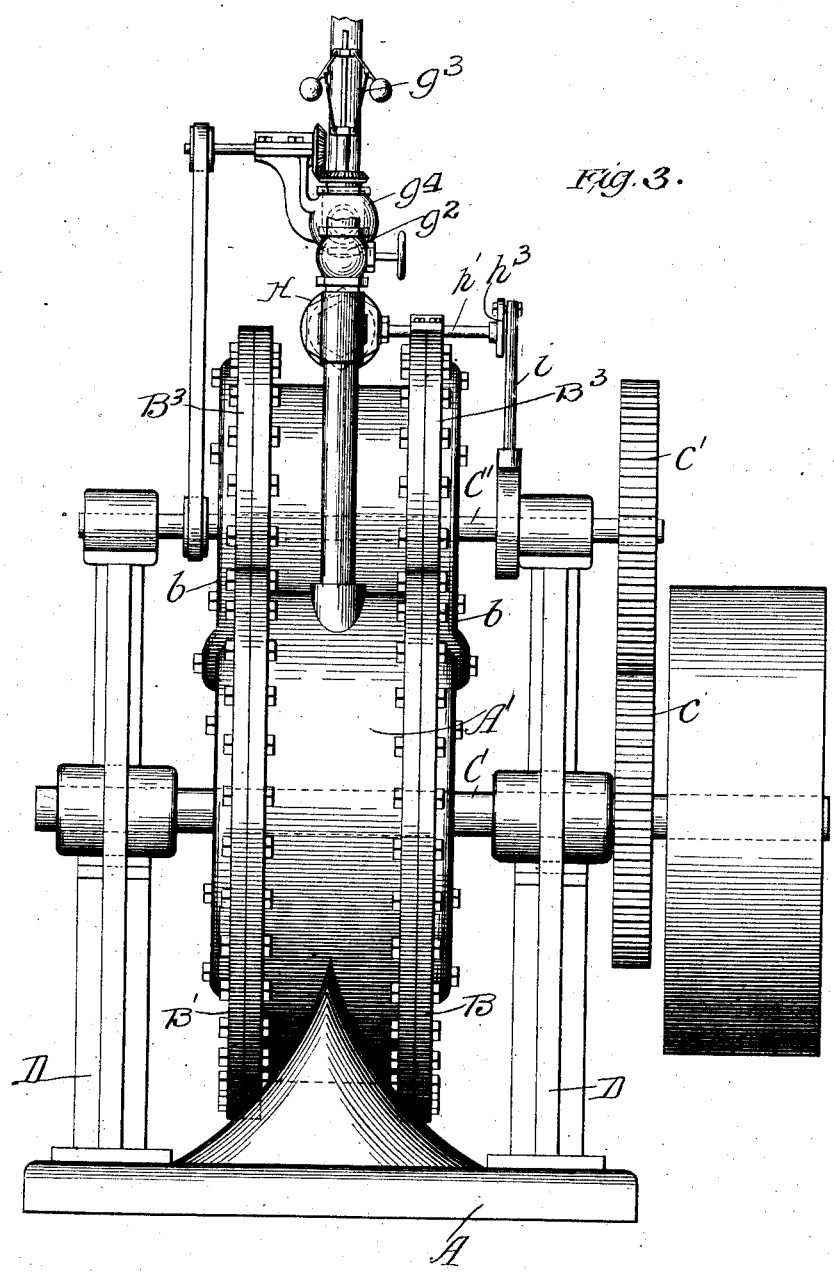
Figure 4:
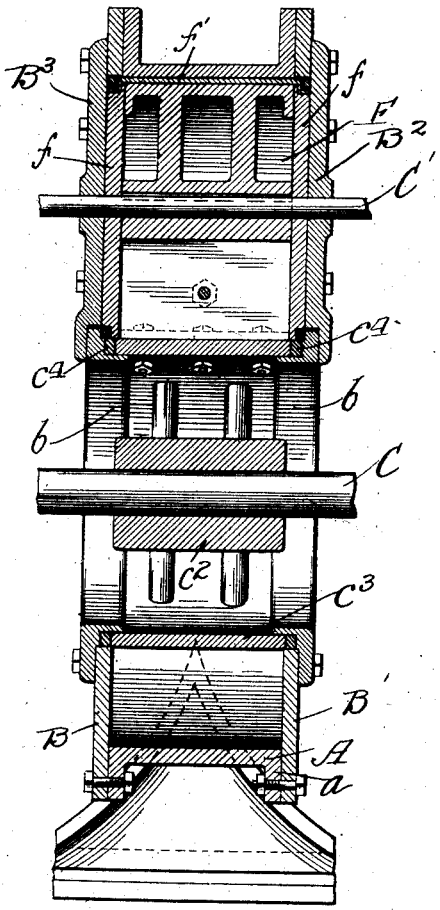
Figure 5:
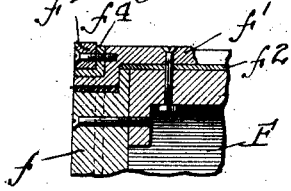
Figure 6:
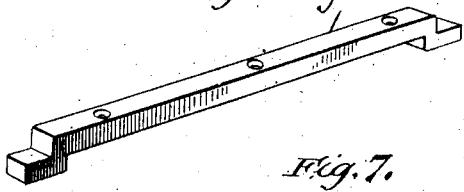
Figure 7:
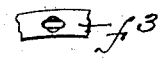
Figure 8:
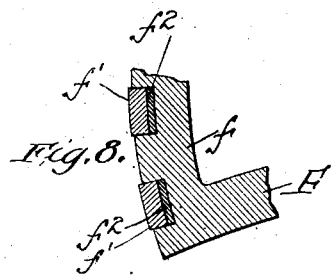
Figure 10:
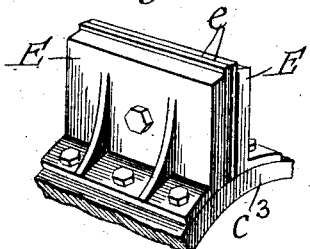
Figure 9:
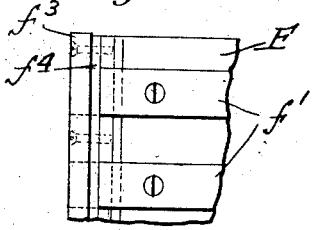

In the drawings: Figure 1 is a side elevation of a device embodying my invention. Fig. 2 is a similar view showing a different position of the valve mechanism. Fig. 3 is a side elevation. Fig. 4 is a central vertical section thereof with the piston head in radial alinement with the piston shaft and valve shaft. Fig. 5 is an enlarged fragmentary detail illustrating the packing of the rotary elements. Figs. 6, 7, 8 and 9 are further views illustrative of the packing. Fig. 10 is a perspective view of the piston head.

As shown in said drawings:—A indicates a base of cast metal or any suitable material adapted to be rigidly secured upon a suitable foundation and having integrally connected therewith a flanged casing A′ adapted to afford the side walls for the steam cylinder and for the rotary valve and bored for the lower steam cylinder and to provide an upper cylindric bore intersecting the same for the rotary valve. Rigidly bolted or otherwise secured to the side flanges *a* of the casing A′ are the heads B and B′ which are cast or otherwise constructed in one piece to close said steam chamber by rigidly bolting to said flanges *a*. Each of said heads is provided concentric with the cylinder with a circular aperture of a diameter equal to the diameter of the rotary element in the cylinder and bolted thereon is an inwardly flanged collar *b* which supports the packing for said rotary element or piston. Supported upon the base A are standards D, one on each side the engine, and provided with bearings at equal heights to rotatively support the driving shaft C and the valve shaft C′. Rigidly secured on the corresponding end of the shafts C and the shaft C′ on the outer side of one of said standards D, are gears *c—c′* of equal size, which intermesh and cause said shafts to rotate oppositely but in exactly the same time.

Rigidly secured on the shaft C is the rotating driving element which I may term the piston comprising a central hub $c^2$, rigidly keyed on the shaft and secured to which is a concentric rim $c^3$, having a width of face sufficient to approximately fill the space between the heads B and B′, except for a packing ring $c^4$, one on each side said piston and which as shown is supported upon the inwardly turned shoulders of the flanged collar. Rigidly bolted to said rotative piston is a piston head which extends transversely the face of said piston cylinder and comprises as shown radially directed members E, having a length equal to the width of face of said piston rim and a height approximately equal to the distance from the rim $c^3$ to the inner wall A′ of the steam cylinder. Said members are flanged at the bottom to fit to and are rigidly bolted on said rim $c^3$, as shown in Figs. 2 and 10. Rigidly engaged between said radially arranged abutment members E are plates *e* of packing material of any suitable kind which bear at all times against the outer or peripheral wall of the cylinder and against the inner sides of the heads B and B′ to afford a steam tight joint. Rigidly secured on the shaft C' is the rotative valve closure F, which fits closely in said valve chamber and is suitably packed to afford a tight joint, and in one side of which transversely thereof is provided a sector shaped notch which extends inwardly to a point coincident with the circumference of the steam chamber or cylinder. The side walls of said closure on each side of said notch are concave or curved outwardly as shown in Fig. 2. Said valve closure as shown is provided at each end with a circular head $f$ in the plane of the heads B and B' of the steam chamber and which are rigidly bolted to and of less diameter than the closure and bear at all times at their lower edges upon the packing strip $c^4$ surrounding the rotative piston rim. The closure is notched or grooved longitudinally to receive therein the plurality of packing bars $f'$ of any suitable material and which bear upon suitable packing materials $f^2$, in the bottom of said grooves being as shown bolted in place. Secured around the periphery of said end plates $f$ on said valve closure and confining the ends of said packing bars is a strip of any suitable metal $f^3$, which confines a packing strip $f^4$, circumferentially around the edge of said closure as shown in Figs. 4 and 5, and thus afford at all times a perfectly tight joint. Heads $B^2$—$B^3$ for the valve chamber are bolted to the flanges and to the outer face of the flanged collar $b$. As shown steam pipes G and G' connect in said steam cylinder closely adjacent the periphery of the valve, either of which may serve as the steam supply pipe, or as the exhaust pipe, dependent upon the adjustment of the controlling valve H. As shown said pipes extend upwardly from said cylinder and are connected by means of branch pipes $g$ each provided with a valve $g'$ with the main steam supply pipe $G^2$. The usual or any suitable centrifugal governor $g^3$ and valve $g^4$ are connected in said supply pipe and at the point of intersection of said branches $g$ with said supply pipe the reversing valve or cut off valve H before mentioned is located. This valve as shown is an oscillating three way plug valve the closure $h$ of which is adapted to be set to connect the steam ports, with either of the branches $g$, thus admitting steam on either side of the rotary valve, and as shown the valve stem $h'$ secured to said closure extends outwardly and is journaled on a part of the said casing and at its outer end is provided with a link $h^3$, having a transverse head thereon and a sector shaped slot therein, in which is engaged the upper ends of the eccentric rod $i$ which is so engaged to the link as to be readily adjusted thereon to vary the duration of steam inlet through the valve H, or by adjustment on either side of the center of the link to admit the steam on either side of the rotary valve closure, to drive the piston in either direction. The lower end of the eccentric rod $i$ is provided with the usual eccentric yoke I which engages an eccentric collar I' on the valve stem or shaft C'.

The operation is as follows: Having adjusted the rotary valve of the engine by bringing the gears in mesh when the piston head is projected into said notch and is in radial alinement with the shafts C and C', the eccentric is set to hold the valve H closed during a sufficient rotation of the piston in either direction to pass the ports and thereafter to afford inlet of the steam. Said intermeshing gears being of the same diameter and having the same number of teeth the rate of rotation of the rotary valve and piston is the same, and the shape of the said notch in said valve is such that the piston head rolls into said notch and out again, said valve almost immediately closing the steam chamber behind the piston head and affording a rigid abutment behind the same for the pressure to react against. As the piston passes the inlet ports the valve H is opened by the eccentric admitting steam pressure into the space between the valve F and abutment E thus driving the piston around the chamber toward the exhaust position. Usually the valve H is arranged to cut off promptly after the admission of steam thus using the steam expansively for a large part of the revolution and exhausting through the pipe oppositely that of steam admission. For example, the pipe G being the steam or inlet pipe the valve $g'$ being opened and the valve $g^2$ above the branch being closed, the pipe G' serves as an exhaust pipe and its valve $g'$ is closed and its valve $g^3$ is open, or shifting the engagement of the eccentric rod with the link to the opposite side of the center thereof, and opening the valve $g'$ admitting the pressure through said pipe G' and closing the corresponding valve $g^2$ and closing the valve $g'$ and opening the valve $g^2$ for the pipe G' said pipe G' becomes the inlet steam pipe, and the steam is exhausted through the pipe G.

The period of steam admission and the amount admitted and thus the entire consumption of steam of course is controllable by the adjustment of the eccentric rod relatively the link whereby either a wide open inlet may be provided and slow closure, or a very restricted opening and quick closure, thus enabling the consumption to be perfectly regulated for either direction of rotation of the piston. Of course the governor valve may be of any desired construction and act as usual by limiting the supply of steam automatically to control the driving rate.

Should it be desired to use the device as a pump either pipe may be used as the induction pipe or as the eduction pipe and in either case valves of any kind are not required and the rotating elements in that case may of course be driven by any suitable mechanism or the machine may be constructed double in which either side may be used as the pump and the other side as the engine to drive the same.

Of course details of construction may be varied and I therefore do not purpose limiting this application for patent otherwise than necessitated by the prior art.

I claim as my invention:—

1. In a device of the class described a casing embracing a cylindric steam chamber and a cylindric valve chamber intersecting each other with parallel axes each beyond the periphery of the other chamber, a rotative piston in the steam chamber, a piston head rigidly secured thereon comprising radially arranged abutments, one or more sheets of packing material engaged between the same and bearing against the inner walls of the cylinder to afford a steam tight joint, and a ring of packing material bearing against each end of the piston.

2. In a device of the class described a casing embracing a cylindric steam chamber and a cylindric valve chamber intersecting each other with parallel axes, each beyond the periphery of the other chamber, a rotative piston in one chamber, a rotative valve in the other notched to receive the piston head therein, intermeshing gears of equal size connected with said piston and valve to drive the same isochronously, said cylinder having ports on opposite sides of the valve either adapted for induction or eduction, pipes communicating with said ports and with each other, an oscillating plug valve controlling either of said pipes, packing around the periphery of the rotative valve and packing around the periphery of the piston adapted to bear against the same.

3. In a device of the class described a casing embracing a cylindric steam chamber and a cylindric valve chamber intersecting each other with parallel axes each beyond the periphery of the other chamber, a rotative piston in the steam chamber, a piston head rigidly secured thereon comprising radially arranged abutments, one or more sheets of packing material engaged between the same and bearing against the inner wall of the cylinder to afford a steam tight joint, a ring of packing material bearing against each end of the piston, a follower bearing against said packing material affording a means of tightening said packing in case of wear.

4. A device of the class described embracing a casing containing a cylindric piston chamber and a cylindric valve chamber intersecting each other with axes parallel but each beyond the periphery of the other, a rotative piston carrying a piston head in one chamber, a rotative valve in the other acting to receive the piston head therein, intermeshing approximately equal gears connected with said piston and valve to drive the same isochronously and ports either adapted for inlet or for exhaust opening into said cylinders on opposite sides of the valve, a controlling valve to admit pressure through either, an eccentric and link for operating the controlling valve and a plurality of manually operated valves for each port adapted one to admit the inlet fluid and the other to close to the atmosphere and the valves for the other port adapted one to open to the atmosphere and the other close to prevent admission of the motive fluid.

5. In a device of the class described a casing embracing a cylindric piston chamber and a cylindric valve chamber intermeshing each other with parallel axes, each axis being beyond the periphery of the other chamber, a rotative piston in one chamber, a head on the periphery thereof to receive the pressure, a rotative valve in the other chamber shaped to receive the piston head therein, intermeshing equal gears connected with said piston, and valve to drive the same isochronously, ports opening into said cylinder on opposite sides of the valve, a pressure supply pipe, branches leading therefrom to each port, a manually operated valve in each branch adapted either to act as inlet valves and either to close against admission of the motive fluid, an exhaust pipe connected in each branch, a manually actuated valve in each, either adapted to exhaust to the atmosphere and either to prevent escape of the motive fluid when the other is acting as the exhaust, a cut off valve in the supply pipe adapted to afford communication between the same and either branch and an eccentric and link to actuate the same and shift the valve to reversing position.

6. In an engine of the class described a steam cylinder, a rotary piston therein having a fixed head on its periphery, a rotary valve having a notch in one side thereof to receive the head, means driving the same isochronously, ports on opposite sides of said valve opening into the steam cylinder, manually operated valves to control said ports to adapt either for use for inlet or for exhaust, a cut off valve positioned to admit to either port means for adjusting the action of said cut off valves, and a governor controlled valve controlling the admission of the motive fluid to the cut off valve.

7. In an engine of the class described a steam cylinder, a rotary piston therein having a fixed head, a rotary valve having a notch in one side thereof to receive the head, means driving the same isochronously, ports on opposite sides of and closely adjacent said valve and opening into the steam cylinder, a pressure supply pipe, branch pipes connecting the same with each port, manually operated valves in each branch one controlling the port the other opening to the atmosphere, a cut off valve positioned to control the admission to either port, means adjusting said valve automatically to cut off the pressure at any desired point between extreme points of pressure.

8. In an engine of the class described a cylinder, a rotary piston therein, a fixed head thereon, a rotary valve normally bearing on the piston and having a notch in one side thereof to receive the head, means driving the same isochronously, ports on opposite sides of said valve opening into the cylinder adapted either for induction or eduction, an exhaust valve and an inlet valve for each port, a cut off valve to adapt either port for induction or for eduction and means for varying the period of admission through said valve.

9. In an engine of the class described a cylinder, a rotary piston therein, a fixed head thereon, a rotary abutment valve having a notch in one side thereof to receive the head, means driving the piston and valve isochronously, ports opening into the cylinder on opposite sides of said valve, controlling valves for the ports, a cut off valve to control either port, means adjusting said valves to adapt either port for an induction or an eduction port, means for varying the cut off and packing means extending around the peripheries of the rotary abutment valve and the piston at the edges thereof and the packing on one bearing against the packing on the other.

10. In a device of the class described a cylinder, a rotary piston therein, a fixed head thereon, a rotary valve notched to receive the head, circular side plates for said valve, transverse packing bars engaged on the valve, a packing strip extending peripherally around the valve plates engaging the ends of the packing bars and packing material between said packing strip and packing bars.

11. In a device of the class described a cylinder, a rotary piston therein, a rotary valve notched to receive the piston, a circular side plate for said valve, transverse packing bars engaged on the valves and side plates, packing strip extending peripherally around the valve plates engaging the ends of the packing bars and packing material between said packing strip and packing bars.

12. In a device of the class described a pressure cylinder, a rotary piston therein, a fixed head thereon, a rotary valve notched to receive the piston head and closing behind the same to afford an abutment, circular side plates for said valve, transverse packing bars seated in and engaged on the valve, a packing strip extending peripherally around the valve plates engaging the ends of the packing bars and packing material between said packing strip and packing bars.

13. In a device of the class described a cylinder a rotary piston therein, a head thereon, a rotary valve notched to receive the piston and adapted to close behind the same to afford an abutment, means driving the valve and piston isochronously, circular side plates for said valve, transverse packing bars engaged in grooves in the valve, a packing strip extending peripherally around the valve plate engaging the ends of the packing bars thereto and packing material between said packing strip and packing bars.

14. In a device of the class described a cylinder, a rotary piston therein, a head thereon, a rotary valve notched to receive the piston and driven isochronously therewith to close behind the same to afford an abutment between the inlet and exhaust ports, circular side plates for said valve, transverse packing bars engaged on the valves, a packing strip extending peripherally around the valve plates engaging the ends of the packing bars, packing material between said packing strip and packing bars and packing material around the periphery of the piston at each end thereof and against which the packing on the valve bears.

15. In a device of the class described a cylinder a rotary piston therein, a head thereon, a rotary valve driven isochronously with the piston and notched to receive the piston head and closing on the piston behind the piston head, circular side plates for said valve, transverse packing bars seated in and engaged on the valve, a packing strip extending peripherally around each valve plate and engaging the ends of the packing bars thereto, packing material between said packing strip and packing bars, packing at the ends of the piston against which the valve packing bears and a cut off and reversing valve adapted for adjustment to vary the cut off or to reverse.

16. In a device of the class described a casing having chambers therein, shafts, one in each chamber, a piston on one shaft, a valve on the other shaft having a recess therein and adapted to contact the piston on each side of the notch, a head rigidly secured to the piston adapted to fit in said notch, ports opening into the piston chamber either adapted for inlet or exhaust, packing extending transversely across the periphery of the valve, packing extending longitudinally around the periphery of the valve and packing at the edges of the piston.

17. In a device of the class described a casing having cylindric chambers therein, shafts, one in each chamber, a rotative piston on one shaft, a rotative valve on the other shaft having a notch therein and adapted to contact the piston on each side of the notch, a head rigidly secured to the piston, ports opening into the piston chamber on each side the valve, either adapted for inlet or exhaust, packing extending transversely across the periphery of the valve, packing extending around the periphery of the valve at each end thereof, packing rings at each end of the piston and a removable plate bearing against said packing for the piston and flanged into the ends of the piston.

18. In a device of the class described a cylindric steam chamber having a rotatable shaft journaled axially therethrough, a hollow piston rigidly secured to the shaft, packing rings against which each end of the piston bears and an inwardly flanged follower bearing against each packing ring and projecting into the piston.

In testimony whereof I have hereunto subscribed my name in the presence of two subscribing witnesses.

JAMES ALLEN EATON.

Witnesses:
 CHARLES W. HILLS,
 FRANCES EATON.